Aug. 26, 1941.                    W. ROTH                    2,254,047
            BUILT-IN GAS GENERATOR FOR INDUSTRIAL FURNACES
                    Filed June 23, 1939         4 Sheets-Sheet 4

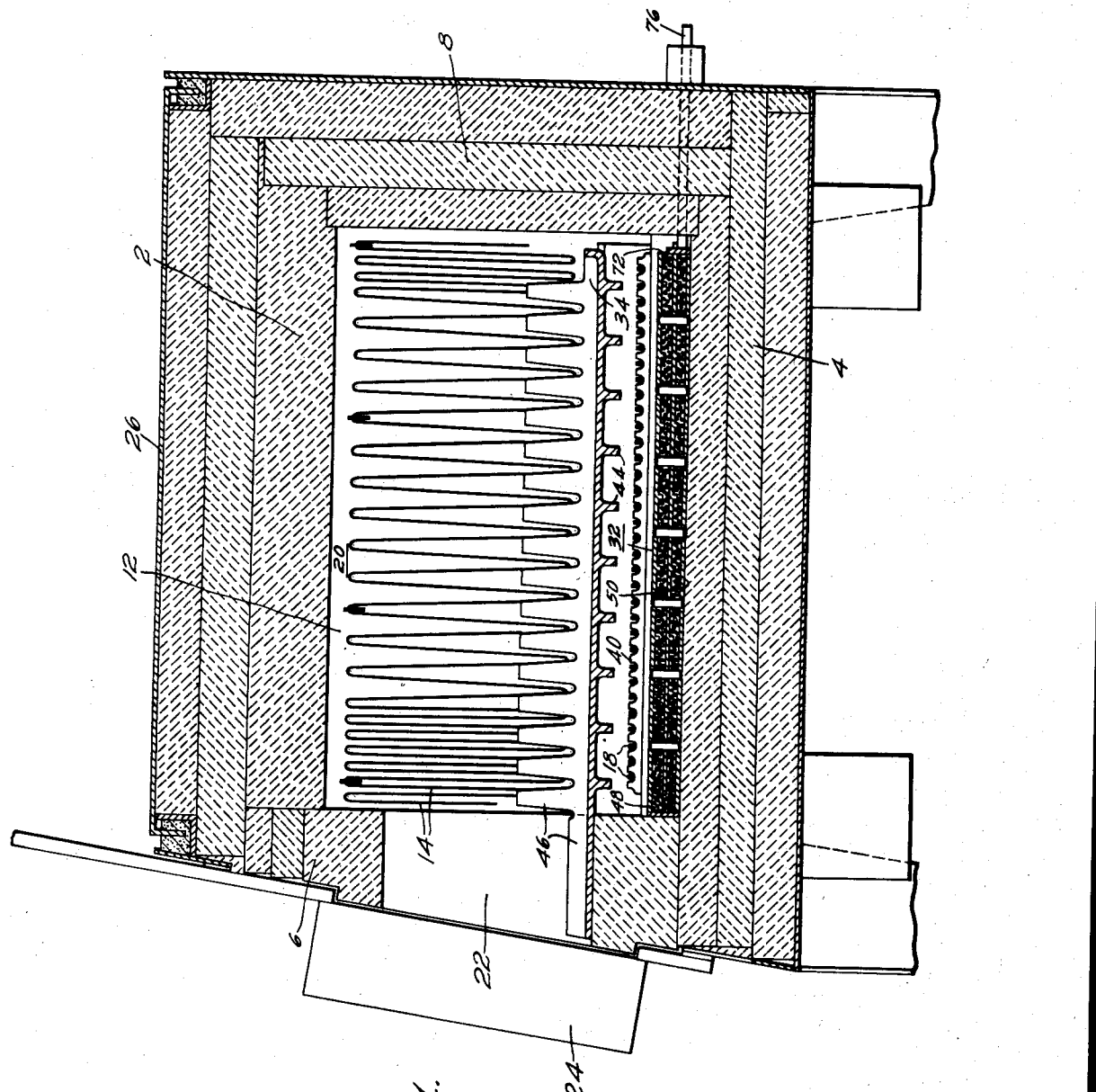

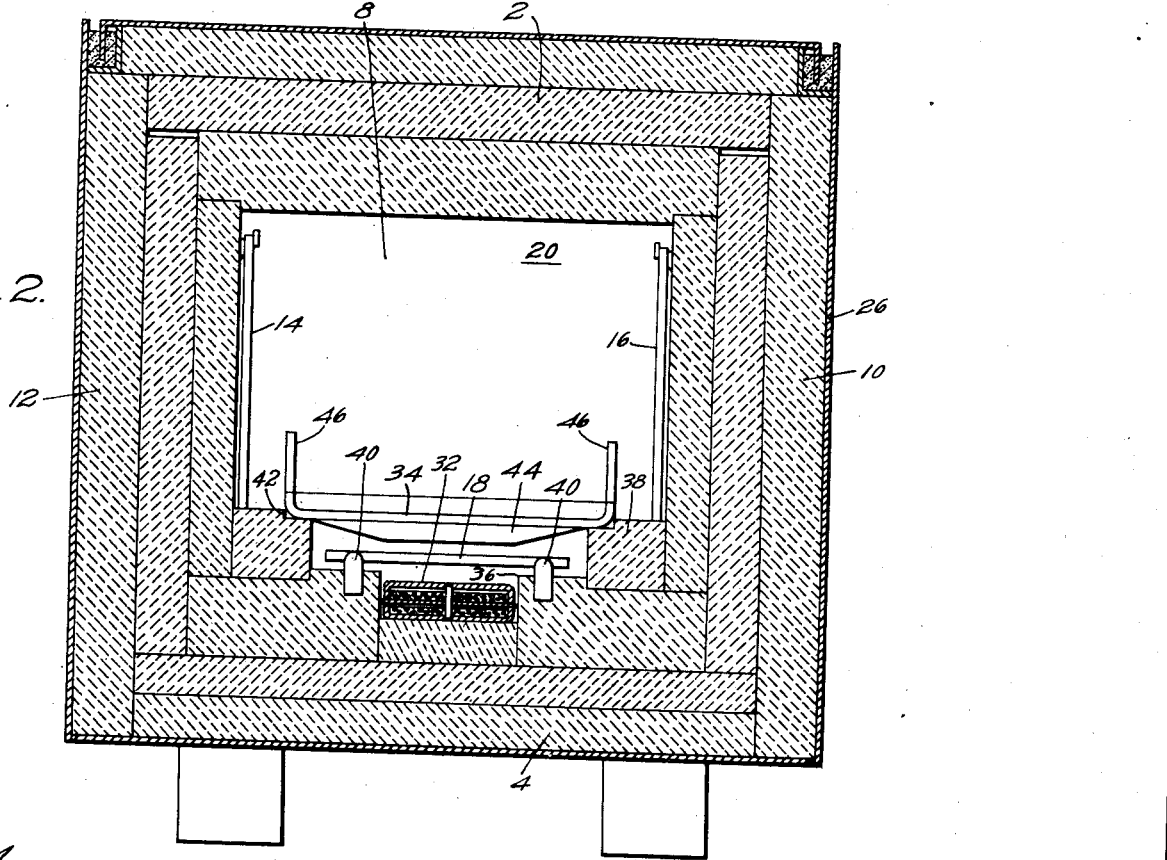
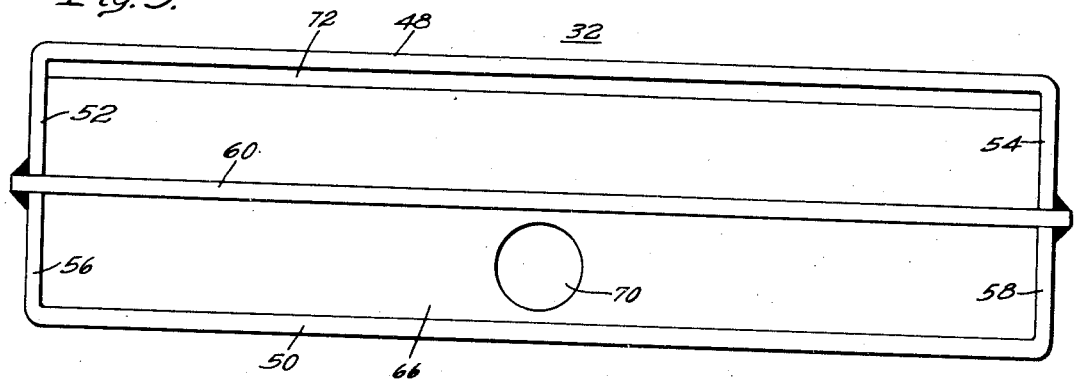

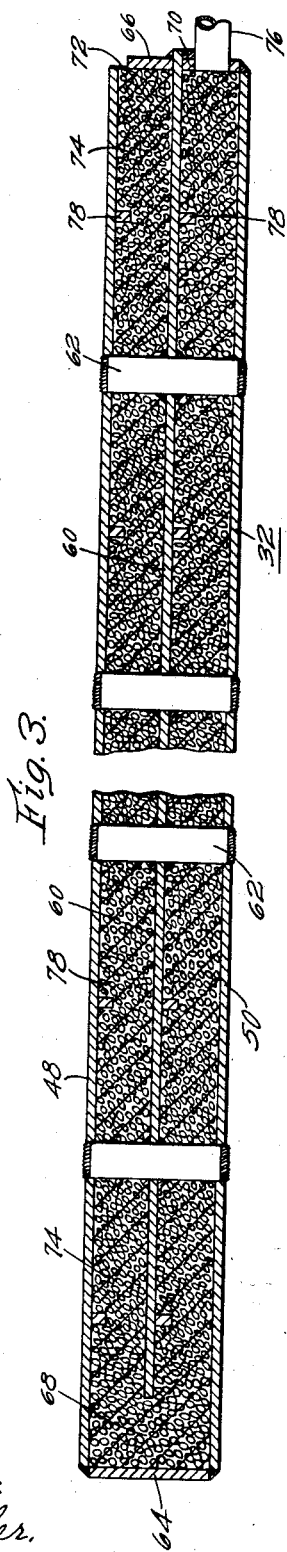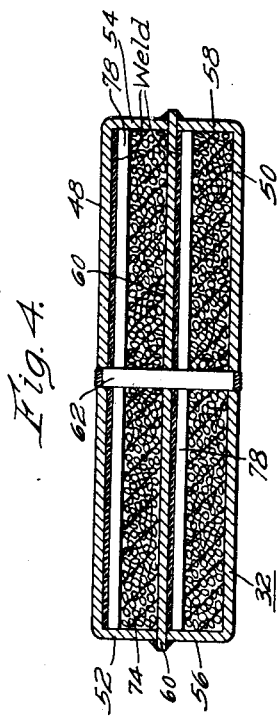

WITNESSES:
C. J. Weller.
B. L. Zangwill

INVENTOR
Willard Roth.
BY
O. B. Buchanan
ATTORNEY

Patented Aug. 26, 1941

2,254,047

UNITED STATES PATENT OFFICE 2,254,047

BUILT-IN GAS GENERATOR FOR INDUSTRIAL FURNACES

Willard Roth, Wilkinsburg, Pa., assignor to Westinghouse Electric & Manufacturing Company, East Pittsburgh, Pa., a corporation of Pennsylvania Application June 23, 1939, Serial No. 280,678

9 Claims. (Cl. 13—20)

Industrial furnaces in which charges are heat-treated while enveloped by protective gaseous atmospheres are now relatively common, and generally each takes the form of a heating chamber, perhaps divided into different heating zones, or even into definite heat-treating zones, for carrying out the required process of heat treatment, the heating chamber being permeated and supplied with the particular protective atmosphere demanded by the process.

The protective atmosphere supplied to the furnace is created in a so-called gas generator. In general, each generator is usually a heat-insulated, reaction or cracking chamber filled with an appropriate catalyst, and in the case where a protective atmosphere is obtained from a rich mixture of hydrocarbon gases and air, may have heating means for maintaining the temperature of the generator at the point at which the desired reactions will occur. Heretofore, such units were built structurally separate and distinct from the furnace, and pipes conveyed the atmosphere from the generator to the heating chamber of the furnace.

To the best of my knowledge, it has always been the practice to build the furnace and the generator as distinct units, but in accordance with the objects of my invention I provide a combined unit in which the generator is built into the furnace as a part thereof.

As a further object of my invention I make the generator a part of a wall of the furnace, preferably the bottom wall, and in furtherance of this object, the generator is made relatively flat with reinforcing bars inside of it to prevent collapse of the flat sides. By disposing the generator in or as part of the furnace wall, I can insulate that part of it away from the heating chamber of the furnace while I permit the opposite part to be in heat exchange relation with the chamber. This construction is attended with certain advantages. Where the protective atmosphere is obtained from a reaction of a hydrocarbon gas with air, heat will be supplied to the heating chamber in the event that the reaction is exothermic as, for example, where a more or less complete combustion of the hydrocarbons with oxygen is encouraged. Where the mixture of air to gas is rich, that is, the ratio of air to hydrocarbon gases is relatively low, and the desired reactions are endothermic, heat will be supplied from the heating chamber to the generator to aid in carrying out the required cracking or reactions of the gases within the generator.

The above and other objects, features, and advantages of my invention are obtained by a preferred construction of a generator, and its particular arrangement in my novel furnace, all of which will be apparent from the following description, taken in conjunction with the accompanying drawings, wherein:

Figure 1 is a vertical longitudinal view in cross-section of a furnace embodying my invention showing the generator therein;

Fig. 2 is a similar view at right angles to the view of Fig. 1;

Fig. 3 is an enlarged longitudinal view in cross-section of the generator;

Fig. 4 is a cross-sectional view of the generator at right angles to the view of Fig. 3;

Fig. 5 is an end view of the generator from the supply end;

Figure 6:
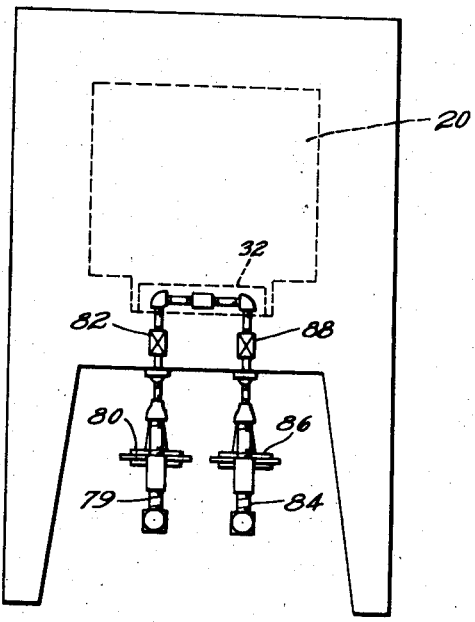
Fig. 6 is a schematic end view, on a smaller scale, of the furnace, showing in greater detail a gas supply means to the generator.
Figure 7:
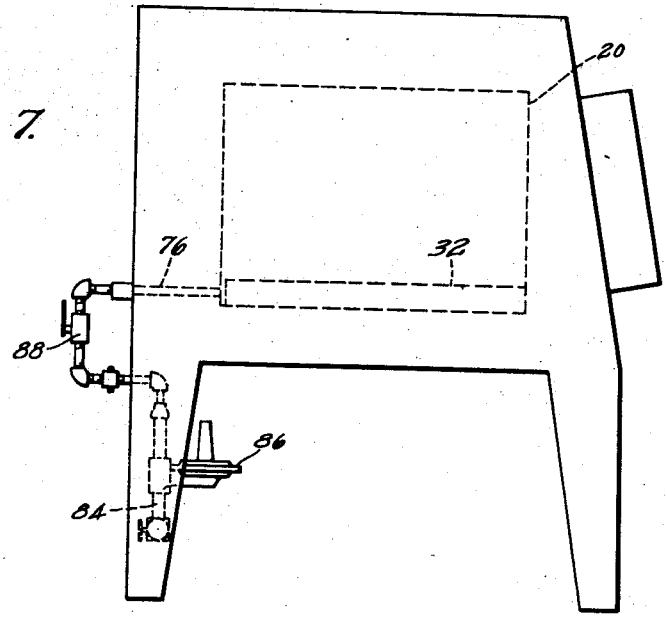
Fig. 7 is a side view of the furnace of Fig. 5 indicating the disposition of my generator therein.

Broadly, my invention comprises a furnace supplied with a built-in generator, and to this end one of the walls of the furnace is designed and laid out to accommodate the generator. Since the generator is made part of the wall, it is therefore deliberately made of relatively large area and little thickness, so that, in effect, the wall thickness is not appreciably increased, and moreover, the generator will have a large surface exposed to the heating chamber of the furnace.

Referring more particularly to Figs. 1 through 5, the furnace proper includes a top wall, a bottom wall, a front, and a rear wall, and side walls indicated each in its entirety by the reference characters 2, 4, 6, 8, 10 and 12, respectively.

The furnace may be heated by any customary means but I prefer electrical resistors. Thus, the side walls 10 and 12 may support heating units 14 and 16 in any suitable manner, and a bottom heating unit 18, also aids in the heating of the heating chamber 20 of the furnace.

The front wall 6 is provided with a customary opening 22 adapted to be covered and uncovered by a closure 24 so that the charge may be inserted into or withdrawn from the furnace.

The walls of the furnace are built of brick and tile capable of withstanding the heat within the furnace and also insulating it, and since the furnace is employed primarily with a protective gaseous atmosphere in the heating chamber, a metallic shell 26 encases the outside of the walls to render the entire furnace substantially gas-impervious.

In this particular embodiment, I prefer to build the gas generator as part of the bottom wall 4, and to this end the bottom wall comprises layers of refractory and insulating brick upon which rests the gas generator indicated in its entirety by the reference 32. The generator 32 extends almost the full length of the heating chamber as shown in Fig. 1, being spaced somewhat from the rear wall for a purpose that will later become apparent. In width the generator is somewhat narrower than the width of the heating chamber in order to permit the bottom wall to be constructed in such manner as to support the bottom heating element 18 and a charge or floor plate 34. As shown more particularly in Fig. 2, the bottom wall has a central depression in which the generator 32 seats. Along each side of this depression are stepped walls 36 and 38, the former being provided with means for supporting combed porcelain tile 40 which, in turn, supports the heating element 18, and the latter being supplied with shoulders 42 on the ledges of which rests the floor plate 34. The steps in the walls 36 and 38 are such as provide some clearance between the gas generator, the heater element and the floor plate.

The floor plate is provided with bottom reinforcing ribs 44 for strengthening purposes, and with side flanges and teeth 46 to protect the side heating elements 14 and 16 against contact or impact with a charge that is being inserted into or removed from the furnace.

In this particular instance, the generator is made of heat-resistance metal alloys, and comprises top and bottom sheets or plates 48 and 50, respectively, these plates being turned over at their sides so that each of the plates is in effect U or channel shaped, the legs of the plate 48 being indicated at 52 and 54, respectively, and the legs of the plate 50 being indicated at 56 and 58, respectively.

In order to elongate the path of the gases to be reacted in the generator, a horizontal baffle plate 60 is also disposed within the generator.

A plurality of bars 62 reinforce the center of the generator and are welded in spaced relation along the longitudinal center lines of the top and bottom plates 48 and 50, and also of the baffle plate 60, the three horizontal plates being provided with suitable apertures to permit the assembly and gas-tight welding together of the parts. In the particular construction shown, the horizontal baffle plate 60 is somewhat wider than the channels formed by the legs of the top and bottom plates so that the ends of the legs may be disposed against it and the elements secured together in gas-tight relation by suitable welds, as shown in Fig. 4. The generator also includes an end plate 64 which is disposed toward the front of the furnace in this particular embodiment, and a rear end plate 66 made of two sections.

The end plate 64 completely encloses the front end of the generator, but it may be observed that the baffle plate 60 terminates somewhat short of the end plate 64 to provide an end passage 68 for turning the gases flowing through the generator. The end plate 66 comprises two sections, a lower section welded, or otherwise gas-tightly secured, between the baffle plate 60 and the lower plate 50, and provided with a central aperture 70; and an upper section of a height somewhat less than the distance between the baffle plate 60 and the top plate 48, so that a discharge opening 72 is provided across the width of the generator. This upper section is welded, or otherwise secured between the plates 60 and 48, with the joints, preferably, gas-tight.

The generator is completely filled with a catalyst 74 to aid in carrying out the reactions of the gases supplied to the generator through an inlet pipe 76 fitting the aperture 70.

In fabricating the generator, I prefer that the different external and internal plates, the reinforcing bars, and the pipe 76 be assembled and secured gas-tight so that gases can flow to and from the generator only in predetermined paths.

As fully disclosed in application Serial No. 216,393, filed by John G. Hoop on June 28, 1938, a catalyst has a tendency to settle with continued use, and for a horizontal generator such as generator 32 which is relatively low, this settling may prove detrimental to the gas reactions. Accordingly, I provide a plurality of spaced vertical baffles 78 extending across the inside surface of the top plate 48, and across the bottom surface of the baffle 60, and welded gas-tight to the parts. The gases flowing through the generator are, therefore, compelled to flow through the catalyst in spite of any clear channels that might occur at the top of the generator compartments when, and if, the catalyst settles.

Referring now more particularly to Figs. 5 and 6, I show how gases may be supplied to the generator. Air under pressure is supplied through a pipe 79, a pressure regulator 80 and a port valve 82 to the inlet pipe 76, and at the same time combustible gas, as, for example, a hydrocarbon gas under pressure, may also be supplied through a pipe 84, pressure regulator 86 and port valve 88 to the inlet pipe 76. The air and gas mix and pass longitudinally through the bottom compartment of the generator between the baffle 60 and the bottom plate 50 until they reach the end space 68. Here the gases turn upwardly around the baffle and then proceed back upon themselves in the upper compartment of the generator between the upper plate 48 and the baffle 60 until they reach the outlet opening 72 at the rear end of the generator and furnace, through which the gases discharge into the heating chamber of the furnace. The gases, of course, are reacted in going through the generator.

It may be observed from Fig. 1 that the product gases discharging from the outlet 72 flow directly and freely into the heating chamber 20 because of the spacing of the outlet end of the generator from the end wall of the furnace. The product gases now in the chamber 20 will envelop any charge that may be placed upon the floor plate 34, and may seep out of the furnace through crevices around the closure 24 or perhaps through a special outlet means provided for the purpose at the front end of the furnace.

The bottom heating elements 18 disposed over the generator 32 will naturally heat the catalyst therein so that any rich mixtures of gases supplied to the generator will be thoroughly reacted and cracked to yield the protective atmosphere of the composition desired. As examples of the operation of my furnace, the following rough table shows the combustion products emitting from the generator with different temperatures of the furnace, and different ratios of Pennsylvania natural gas and air supplied to the generator under a pressure of two inches of mercury:

*Analysis of product gases*

| | Furnace temp. | Air to gas ratio | $H_2$ | CO | $CO_2$ |
|---|---|---|---|---|---|
| | Degrees F. | | Percent | Percent | Percent |
| 1 | 1750 | 3.38 | 31.0 | 16.4 | 2.6 |
| 2 | 1500 | 4.12 | 25.1 | 14.1 | 3.7 |
| 3 | 1500 | 1.83 | 31.5 | 16.9 | 1.6 |
| 4 | 1350 | 1.65 | 26.7 | 15.1 | 1.3 |
| 5 | 1350 | 5.36 | 13.3 | 8.8 | 6.1 |

It may be observed that the above table indicates only the percentages of hydrogen, carbon monoxide, and carbon dioxide in the protective atmosphere, the balance, of course, being nitrogen, with possibly small amounts of water vapor and methane.

From the analysis indicated, it is apparent that the generator produced good cracking of the gas as evidenced by the high percentages of hydrogen and carbon monoxide obtained even at the lower furnace temperatures. It may be further observed that at the richer ratios the carbon dioxide component of the product gases is sufficiently low so that even high carbon steels can be heat-treated with negligible surface decarburization of short cycles. As a matter of fact, tests indicated that steels having a carbon content of 1% could be safely heat-treated at 1500° F. for at least one-half hour, but this limit is by no means an upper limit, the test runs merely being conducted for that interval.

It is, of course, obvious that the ratio and volumes of air to gas supplied to the generator can be easily and readily controlled through appropriate valve systems or control apparatus, and if desired a pilot pipe may be branched from the inlet pipe 76 so that a small flame may be obtained from the characteristics of which the mixture can be approximately judged, as is well known to those skilled in the art.

One of the important advantages of the construction shown in this application lies in the exposure of the generator to the heat of the furnace and the insulation of its lower part so that the heat may be retained. Manifestly, with this construction rich mixtures of gas and air are assured of complete reaction in the catalyst-filled generator 32, since the necessary heat for the reactions comes from the furnace itself. A second important advantage of my invention is in the disposition of the gas discharge means in the chamber. No pipes are necessary and the product gases coming from the generator flow directly into the rear of the heating chamber so that the customary forward seepage will maintain the atmosphere in the heating chamber clean and pure. Probably the biggest advantage I achieve with my invention lies in the combining of the generator inside the furnace and in such a manner that the cost of the combined unit is not very considerable above that of a furnace alone, and compares particularly favorably with the cost of two separate units hithertofore employed.

While I have shown my invention in a preferred embodiment thereof, it is obvious that many equivalents and modifications will occur to those skilled in the art, and that, therefore, my invention is not necessarily limited to the specific details of the embodiment chosen as the vehicle by which to describe its important features.

I claim as my invention:

1. A furnace for heat-treatment of charges while enveloped by a protective gaseous atmosphere, said furnace comprising walls defining a heating chamber for heat-treating the charges, at least one of said walls being supplied with electric heating means for said chamber disposed along said one wall, said one wall comprised in part of a catalyst-filled flat metal-encased gas reaction generator having a substantially flat side extending in proximity to said heating means, and insulating brick also forming part of said one wall and covering the side of said generator opposite the said flat side.

2. An equipment for heat-treating charges while enveloped by a protective gaseous atmosphere comprising a furnace having top, bottom, front, rear and side walls defining a heat-treatment chamber in which the charge undergoing heat-treatment is to be disposed, heating means in said chamber, said front wall having an opening through which the charge may be inserted into and withdrawn from the furnace, a closing means for said opening, a flat, reinforced, gas-reaction generator being part of said bottom wall of said furnace and containing a catalyst, pipe means to convey to said generator, gases to be reacted or cracked in said generator to produce the protective atmosphere, and said generator having means for causing the discharge of resultant products of reaction from said generator into said chamber and at the said rear wall.

3. The structure of claim 2 in which said heating means includes a bottom wall electric resistor directly above said generator.

4. A furnace for heat-treating charges while enveloped by a gaseous atmosphere, said furnace comprising top, bottom, rear, front and side walls defining a heat-treatment chamber, and a metallic shell encasing said walls, said bottom wall comprising a bottom layer of refractory brick, flat catalyst-filled metallic gas-reaction generator means resting on said brick, gas-inlet means to said generator means, said generator means being provided with gas-outlet provisions entirely within said shell for discharging product gases into said heat-treatment chamber.

5. A furnace for heat-treating charges while enveloped by a gaseous atmosphere, said furnace comprising top, bottom, rear, front and side walls defining a heat-treatment chamber, and a metallic shell encasing said walls, said bottom wall comprising a bottom layer of refractory brick and a catalyst-filled gas-reaction generator resting thereon, said generator extending substantially the length of said chamber and of somewhat less width, bottom wall electric heating means, and refractory tiers on each side of said generator having means for supporting said electric heating means directly above said generator.

6. A furnace for heat-treating charges while enveloped by a gaseous atmosphere, said furnace comprising top, bottom, rear, front and side walls defining a heat-treatment chamber, and a metallic shell encasing said walls, said bottom wall comprising a bottom layer of refractory brick and a catalyst-filled gas-reaction generator resting thereon, said generator extending substantially the length of said chamber and of somewhat less width, bottom wall electric heating means, refractory tiers on each side of said generator having means for supporting said electric heating means directly above said generator, and a charge-supporting plate directly above said heating means.

7. A furnace for the heat-treatment of charges while eneveloped by a controlled gaseous atmosphere, comprising walls defining a heat-treatment chamber, heating means for said chamber, said walls comprising a substantially flat elongated, catalyst-filled metal-encased gas reaction generator disposed in heat exchange relation with respect to said chamber, gas-inlet means to said generator for supplying said generator with gases to be reacted therein, said generator having provisions for causing the gases therein to flow through said catalyst in elongated paths of lengths greater than any dimension of said generator, said generator having outlet means within the confines of said walls for discharging the reaction gas-products of said generator into said chamber, said walls further comprising insulating means on the side of said generator away from said chamber.

8. A furnace for the heat-treatment of charges while enveloped by a protective gaseous atmosphere, comprising walls defining a heat-treatment chamber for heat-treating the charges, one of said walls comprising a gas-reaction generator on the side of said wall toward said chamber and insulating brick on the outer side of said generator, said generator comprising a gas-tight metal casing having an area substantially the same as the area of the portion of said one wall defining said heating chamber, said generator being relatively narrow in a direction transverse to said area, and having gas-inlet means and gas-outlet means, said casing being substantially filled with a divided catalytic mass, said casing having baffle means therein providing an elongated path for the flow of admitted gases through said catalytic mass from said gas-inlet means to said gas-outlet means.

9. An equipment for heat-treating charges while enveloped by a protective atmosphere, comprising a furnace having spaced substantially horizontal walls and pairs of opposite substantially vertical walls joining said substantially horizontal walls to provide a heat-treatment chamber in which the charge to undergo heat-treatment is to be disposed, heating means for heating said chamber, one of said substantially vertical walls having an opening through which the charge may be inserted into said chamber, closing means for said opening, a substantially flat, gas-reaction generator being part of one of said substantially horizontal walls, said generator including an outer metallic casing containing a divided catalytic mass, pipe means for conveying to said casing, gases to be reacted or cracked in said generator, said casing being provided with means for providing elongated paths therein to be traversed by the admitted gases, said casing being elongated in a direction from said closing means, said casing including gas-discharge openings only at the far end of said generator with respect to said closing means, said gas-discharge openings being adapted to discharge gas-products from said generator substantially directly into said chamber.

WILLARD ROTH.